United States Patent
Mecklin

(10) Patent No.: US 7,599,378 B1
(45) Date of Patent: Oct. 6, 2009

(54) SIGNALLING IN A TELECOMMUNICATIONS NETWORK

(75) Inventor: Tomas Christian Fredrik Mecklin, Esbo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 731 days.

(21) Appl. No.: 10/168,996

(22) PCT Filed: Nov. 28, 2000

(86) PCT No.: PCT/EP00/11918

§ 371 (c)(1),
(2), (4) Date: Jun. 21, 2002

(87) PCT Pub. No.: WO01/49045

PCT Pub. Date: Jul. 5, 2001

(30) Foreign Application Priority Data

Dec. 24, 1999 (GB) .................................. 9930614.4

(51) Int. Cl.
*H04L 12/28* (2006.01)
(52) U.S. Cl. ...................................... 370/401; 370/410
(58) Field of Classification Search ................. 370/410, 370/401
See application file for complete search history.

(56) References Cited

U.S. PATENT DOCUMENTS

| | | | |
|---|---|---|---|
| 5,793,771 A | 8/1998 | Darland et al. | 370/467 |
| 6,011,803 A * | 1/2000 | Bicknell et al. | 370/467 |
| H1836 H * | 2/2000 | Fletcher et al. | 455/433 |
| 6,490,451 B1 * | 12/2002 | Denman et al. | 370/352 |
| 6,795,444 B1 * | 9/2004 | Vo et al. | 370/401 |
| 6,832,088 B1 * | 12/2004 | Stumpert | 455/445 |
| 6,970,543 B2 * | 11/2005 | Lautenschlager et al. | 379/142.04 |
| 7,054,325 B1 * | 5/2006 | Archibald | 370/410 |

FOREIGN PATENT DOCUMENTS

| | | |
|---|---|---|
| EP | 0 853 411 A2 | 7/1998 |
| WO | WO 97/16007 | 5/1997 |

OTHER PUBLICATIONS

Huitema, C. et al., "An Architecture for Residential Internet Telephony Service", IEEE Internet Computing, May-Jun. 1999, (pp. 73-82).

Anquetil, L-P. et al., "Media Gateway Control Protocol and Voice Over IP Gateways. MGCP and VoIP Gateways Will Offer Seamless Interworking of New VoIP Networks With Today's Telephone Networks", Electrical Communication, BE, Alcatel, Brussels, Apr. 1, 1999, (pp. 151-157).

* cited by examiner

*Primary Examiner*—Andrew Lee

(57) ABSTRACT

A method of transporting Call Control related signalling information between a first telecommunications network employing Signalling System No. 7 (SS7) signalling and a second telecommunications network in which Call Control functionality is handled by Media Gateway Controllers and Bearer Control is handled by Media Gateways. The method comprises routing Call Control related signalling data between the signalling network and a Media Gateway Controller through a Media Gateway controlled by said Media Gateway Controller, wherein said Media Gateway implements the lower layers of SS7.

12 Claims, 3 Drawing Sheets

US 7,599,378 B1

SIGNALLING IN A TELECOMMUNICATIONS NETWORK

FIELD OF THE INVENTION

The present invention relates to signalling in a telecommunications network and in particular to signalling in a telecommunications network in which network signalling points are split into a call control part and a bearer control part.

BACKGROUND TO THE INVENTION

Telecommunications networks currently rely to a large extent upon Signalling System No. 7 (SS7) as the mechanism for controlling call connections and for handling the transfer of signalling information between signalling points of the networks. Typically, one or more application and user parts at a given signalling point will make use of SS7 to communicate with peer application and user parts at some other signalling point. Examples of user parts are ISUP (ISDN User Part) and TUP (Telephony User Part) whilst examples of application parts are INAP (Intelligent Network Application Part) and MAP (Mobile Application Part). The conventional SS7 protocol stack includes Message Transfer Parts MTP1, MTP2, and MTPee3 which handle the formatting of signalling messages for transport over the physical layer as well as various routing functions. Both signalling and user data is carried over Synchronous Transfer Mechanism (STM) networks using either the E.1 (Europe) or T.1 (USA) systems. In some cases a common STM network is used for both signalling and user data whilst in other cases separate STM networks are used.

There has been considerable interest of late amongst the telecommunications community in using non-standard (i.e. non-conventional within the telecommunications industry) signalling and user data transport mechanisms in telecommunications networks in place of the conventional mechanisms. The reasons for this are related both to improvements in efficiency as well as potential cost savings. Much consideration has been given for example to the use of Internet Protocol (IP) networks to transport signalling and user data between network nodes. IP networks have the advantage that they make efficient use of transmission resources by using packet switching and are relatively low in cost due to the widespread use of the technology (as opposed to specialised telecommunication technology). There is also interest in using other transport mechanisms including ATM (AAL1/2/5), FR etc.

ISUP, which deals with the setting-up and control of call connections in a telecommunications network, is closely linked to the E.1/T.1 STM transport mechanisms and does not readily lend itself to use with non-standard transport technologies such as IP and ATM. As such, several standardisation bodies including the ITU-T, ETSI, and ANSI, are currently considering the specification of a signalling protocol for the control of calls, which is independent of the underlying transport mechanism. This is illustrated in FIG. 1 and can be viewed as separating out from the signalling protocol, Bearer Control functions which relate merely to establishing the parameters (including the start and end points) of the "pipe" via which user plane data is transported between nodes, and which are specific to the transport mechanism. The new protocol, referred to as Bearer Independent Call Control (BICC) or Transport Independent Call Control (TICC), retains Call Control functions such as the services invoked for a call between given calling and called parties (e.g. call forwarding), and the overall routing of user plane data. It is noted that signalling traffic at the Call Control level may be sent over a network (IP, ATM, SS7, etc) which is separate from the network over which Bearer Control signalling traffic and user data is sent. However, in some cases a single shared network may be used. As well as TICC, alternative transport independent call control protocols exist including SIP.

The new network architecture resulting from the separation of the Call and Bearer Control levels results in an open interface appearing between a Call Control entity and a Bearer Control entity, where these entities are referred to as a Media Gateway Controller and a Media Gateway respectively. The open interface is referred to hereinafter as X-CP, examples of which are the MEGACO work of the IETF and the H.248 work of ITU Study Group 16 (SG16). It is envisaged that a given Media Gateway Controller may control several Media Gateways (or indeed a Media Gateway may be controlled by several Media Gateway Controllers).

FIG. 2 illustrates schematically a situation where a telecommunications network operator uses a first ATM network to carry user data and Bearer Control signalling traffic, and a second ATM network to carry Call Control signalling traffic (in FIG. 2 not all protocol layers and other functionalities are shown for the sake of clarity). It is necessary for the operator to provide an interface to a conventional telecommunications network (e.g. a Public Switched Telephone Network (PSTN)), and this is achieved via a Media Gateway Controller 1, a Signalling Gateway 2, and a Media Gateway 3.

The BICC entity of the MGC 1 sits on top of an MTP1 to 3$b$ entity which in turn sits on top of an AAL2 entity. These layers allow communications with peer MGCs over the ATM network. The MGC 1 communicates with the MG 3 using a Gateway Control Protocol (GCP) over an IP interface (or using another suitable protocol). In addition, the MGC 2 has ISUP, TCAP, and SCCP entities which enable communication with PSTN signalling points. Call Control related signalling traffic is transported between the MGC 2 and the PSTN through the SG 2, with the SG terminating the MTP layers 1 to 3. The MG 3 comprises, in addition to the GCP and AAL2 entities, an MTP layer 1 to 3$b$ entity which enables the setting up of connections over the ATM bearer network (e.g. using B-ISUP). The MG 3 is also connected to the PSTN to send user data to, and receive user data from, the PSTN. In the MG 3, the block identified as "MG functionality" indicates the intelligent functions performed by the MG 3.

SUMMARY OF THE PRESENT INVENTION

The inventor of the present invention has recognised that network operators may be reluctant to purchase separate signalling gateways given that these are relatively simple nodes The requirement for separate signalling gateways also results in a requirement for a dedicated PCM cable signalling connection to the PSTN, in addition to the PCM user data connection between the Media Gateway and the PSTN. The present invention overcomes these disadvantages by incorporating the functionality of the signalling gateway into the Media Gateway.

According to a first aspect of the present invention there is provided a method of transporting Call Control related signalling information between a first telecommunications network employing Signalling System No. 7 (SS7) signalling and a second telecommunications network in which Call Control functionality is handled by Media Gateway Controllers and Bearer Control is handled by Media Gateways, the method comprising routing Call Control related signalling data between the signalling network and a Media Gateway Controller through a Media Gateway controlled by said Media Gateway Controller, wherein said Media Gateway terminates the lower layers of SS7.

Preferably, said lower layers of SS7 which are implemented in the Media Gateway are the Message Transport Parts (MTPs) 1 to 3 (or 3b).

Preferably, the method comprises sending from the Media Gateway Controller to the Media Gateway an instruction (or instructions) to associate a pair of terminations of the Media Gateway using a context. More preferably, a first of the terminations represents a flow of signalling data between the Media Gateway and the first network and a second of the terminations represents a flow of data between the Media Gateway and the Media Gateway Controller, said lower layers of SS7 being implemented by the first termination and said context specifying a connection between the first and second terminations.

Preferably, the termination association is handled by the Media Gateway Controller using the MEGACOP protocol defined by the IETF or H.248 defined by SG16.

Typically, signalling information is transported between the first signalling network and the Media Gateway over an E.1 or T.1 transport network. The network may be a dedicated signalling network (where all time slots, with the exception of a synchronisation time slot, are available for signalling) or may be a combined network (where certain time slots are dedicated to signalling and other time slots are dedicated to user information). Preferably, said first termination represents a flow of signalling data between the Media Gateway and the first network on a single E.1/T.1 time slot per frame.

Preferably, said signalling data is transported between the first signalling network and the Media Gateway over a PCM cable. More preferably, this cable also carries user data.

Preferably, signalling data is transported between the Media Gateway and the Media Gateway Controller over an Internet Protocol interface. More preferably, control instructions and associated signalling is also carried over that IP interface. Alternatively, data may be transported between the Media Gateway and the Media Gateway Controller over an ATM interface, using for example MTP3 (or MTP3b).

According to a second aspect of the present invention there is provided apparatus for transporting Call Control related signalling information between a first telecommunications network employing Signalling System No. 7 (SS7) signalling and a second telecommunications network in which Call Control functionality is handled by Media Gateway Controllers and Bearer Control is handled by Media Gateways, the apparatus comprising a Media Gateway Controller coupled to a Media Gateway, the Media Gateway being further coupled to said first network and comprising processing means for implementing the lower layers of SS7, wherein Call Control related signalling information is transported between the first network and the Media Gateway Controller via the Media Gateway.

DETAILED DESCRIPTION OF CERTAIN EMBODIMENTS

Figure 1:
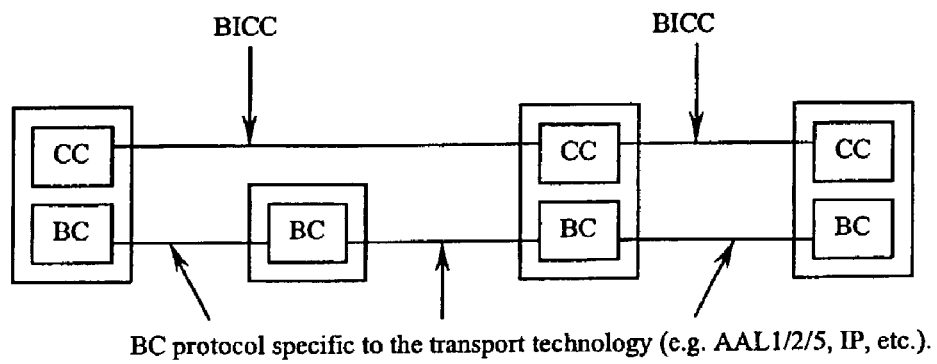
FIG. 1 illustrates a telecommunications network in which the Call Control level is independent of the Bearer level.
Figure 2:
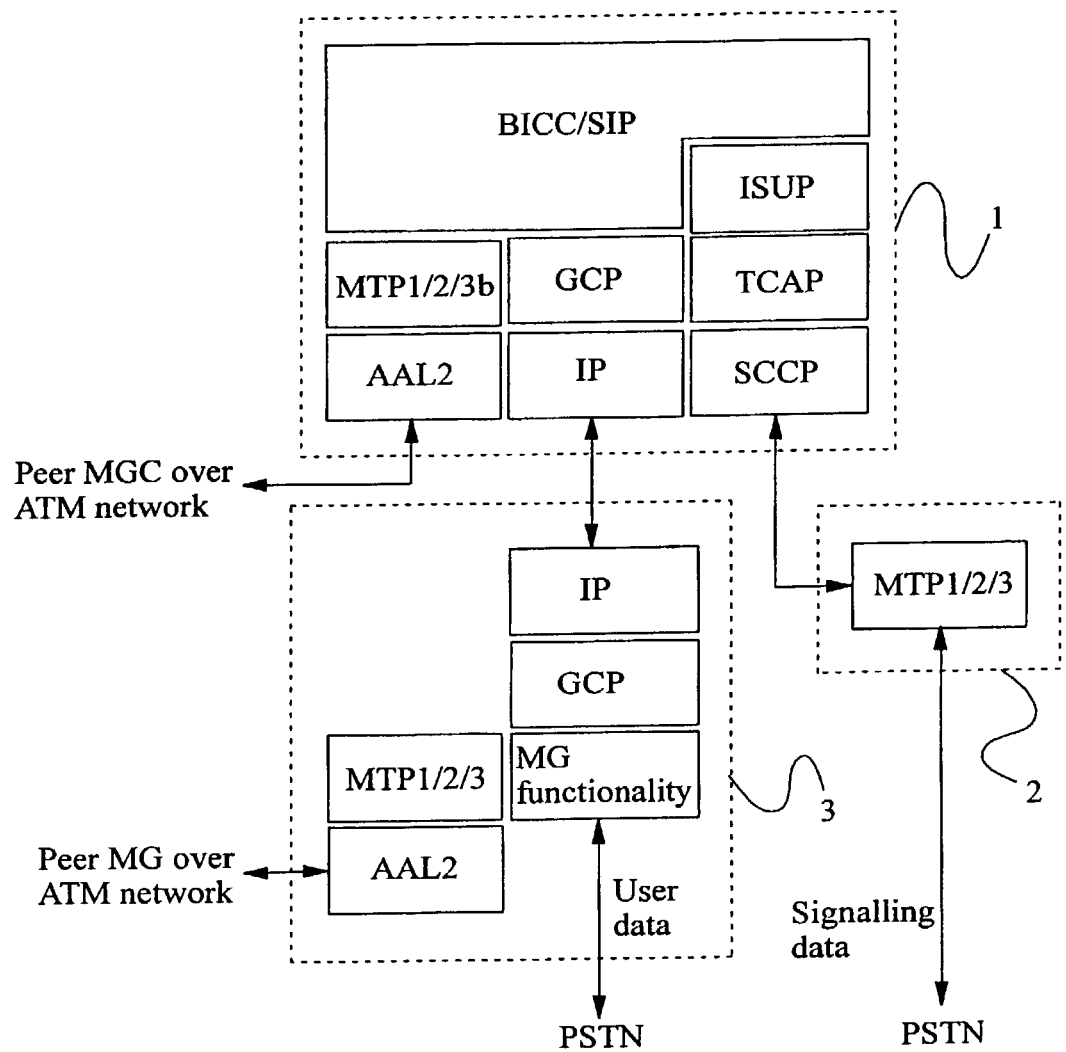
FIG. 2 illustrates an interface between a PSTN and the network of FIG. 1 according to an existing proposal.

FIG. 1 illustrates in very general terms a telecommunications network in which signalling points are split into Media Gateway Controllers and Media Gateways, where the Media Gateway Controllers form a Call Control (CC) layer and the Media Gateways form a Bearer Control (BC) layer. A Media Gateway Controller may control one or several Media Gateways. FIG. 2 illustrates, according to current proposals, the components present at an interface between a PSTN network and a network in which the Call Control layer is independent of the Bearer Control layer. More particularly, FIG. 2 illustrates the protocol layers present at the interface.

Figure 3:
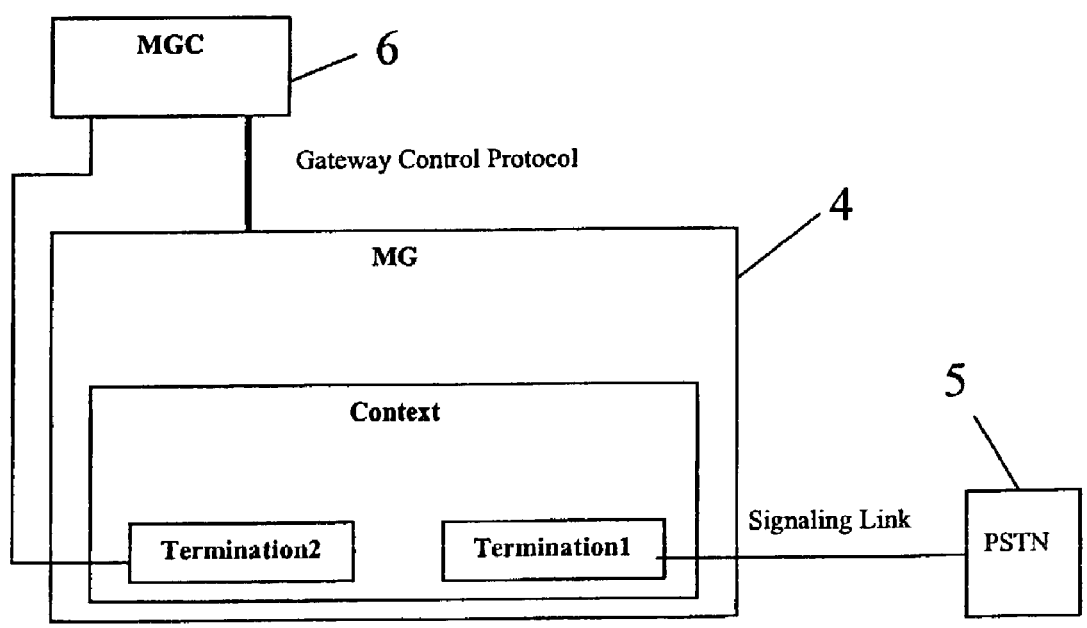
FIG. 3 illustrates schematically an alternative network interface.

FIG. 3 illustrates schematically a Media Gateway (MG) 4 coupled between a PSTN exchange 5 and a Media Gateway controller (MGC) 6, where the MG 4 is coupled to a bearer traffic transport (ATM) network and the MGC 6 is coupled to a Call Control signalling (ATM) network as described above with reference to FIG. 2. As has also been described above, the MGC 6 controls the MG to set up appropriate connections to peer MGs over the bearer traffic transport network 7. The GCP protocol (H.248) used by the MGC 6 to control the MG 4 specifies "Terminations" and "Contexts" within the MG 4. Terminations represent one or more user data flows into or out of the MG 4 whilst Contexts represent connection between Terminations. A termination may have packages and properties added to it to specify the capabilities of the Termination. The functionality of a Signalling Gateway may be described by way of a package (e.g. point codes, service indicators etc). A termination supporting this package has the ability to terminate the lower layers of SS7 (i.e. MTPs 1 to 3). In FIG. 3, it is assumed that the MGC 6 has caused a pair of Terminations T1 and T2 to be created at the MG 4, the Terminations being connected by a Context C1. The Termination T1 represents a signalling time slot on the E.1/T.1 PCM cable, and has a package added to it representing the Signalling Gateway functionality. The Termination T2 represents a connection to the MGC 6 over the TCP/IP interface.

Figure 4:
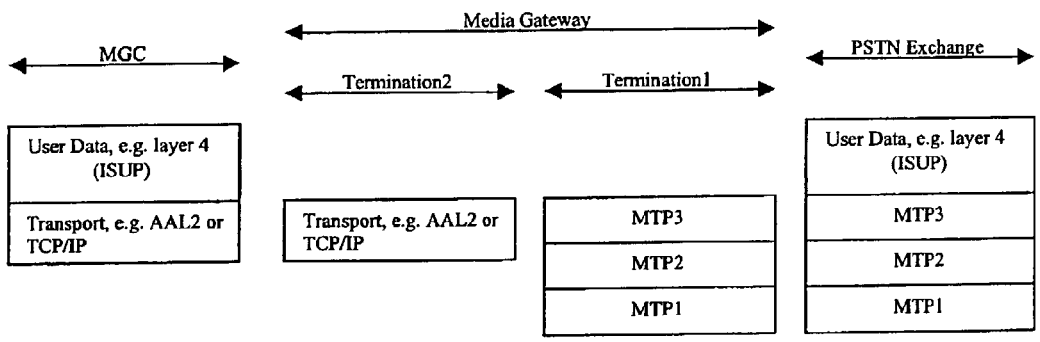
FIG. 4 illustrates protocol layers present in the interface of FIG. 3.

FIG. 4 illustrates the protocol layers present at several points in the network interface. As already described above, the PSTN exchange 5 implements the various protocol layers of SS7 including for example ISUP (TCAP, SCCP), and MTPs 1 to 3. The MTPs 1 to 3 are terminated at the MG 4 by the Termination T1. The Termination T2 of the MG 4 and the MGC 6 implement TCP/IP protocol layers to facilitate the transport of signalling information therebetween.

Figure 5:
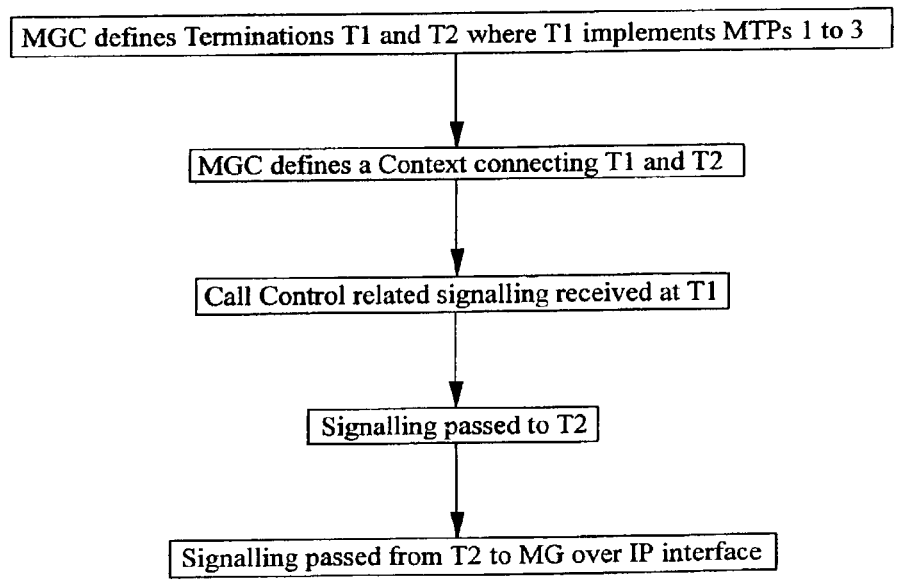
FIG. 5 is a flow diagram illustrating the method of transporting signalling information over the interface of FIG. 3.

The method of transporting Call Control related signalling to the Media Gateway as described above, is further illustrated in the flow diagram of FIG. 5.

It will be appreciated that various modifications may be made to the above described embodiment without departing from the scope of the present invention. For example, the invention is applicable to providing an interface between a first network in which the Call Control and Bearer Control levels are separated and a second, SS7 network in which the signalling and call data are sent on a combined network or on separate networks.

The invention claimed is:

1. A method of transporting Call Control related signaling information between a first telecommunications network employing Signaling System No. 7 (SS7) signaling and a second telecommunications network in which Call Control functionality is handled by Media Gateway Controllers and Bearer Control is handled by Media Gateways, the method comprising a Media Gateway Controller specifying a first termination and a second termination, connected by a Context, in a Media Gateway, the first termination including a package representing Signaling Gateway functionality and the second termination representing connection to the Media Gateway Controller over a TCP/IP interface;

routing Call Control related signaling data between the first telecommunications network and said Media Gateway Controller via said first and second terminations in the Media Gateway.

2. The method according to claim 1, wherein said lower layers of SS7 which are implemented in the Media Gateway are the Message Transport Parts (MTPs) 1 to 3 or 1 to 3b.

3. The method according to claim 1 comprising sending from the Media Gateway Controller to the Media Gateway instructions to associate the first and second terminations of the Media Gateway using a context, where the first termination represents a flow of signaling data between the Media Gateway and the first network and the second termination represents a flow of data between the Media Gateway and the Media Gateway Controller.

4. The method according to claim 3, wherein said lower layers of SS7 are implemented by the first termination and said context specifies a connection between the first and second terminations.

5. The method according to claim 3, wherein the termination association is handled by the Media Gateway Controller using the MEGACOP protocol defined by the IETF or H.248 defined by SG16.

6. The method according to claim 1, wherein signaling information is transported between the first signaling network and the Media Gateway over an E.1 or T.1 transport network.

7. The method according to claim 6, wherein said first termination represents a flow of signaling data between the Media Gateway and the first network on a single E.1/T.1 time slot per frame.

8. The method according to claim 1, wherein said signaling data is transported between the first signaling network and the Media Gateway over a PCM cable.

9. The method according to claim 8, wherein said PCM cable also carries user data.

10. The method according to claim 1, wherein signaling data is transported between the Media Gateway and the Media Gateway Controller over an Internet Protocol interface.

11. Apparatus for transporting Call Control related signaling informationa between a first telecommunications network employing Signaling System No. 7 (SS7) signaling and a second telecommunications network in which Call Control functionality is handled by Media Gateway Controllers and Bearer Control is handled by Media Gateways, the apparatus comprising a Media Gateway Controller coupled to a Media Gateway, the Media Gateway Controller specifying a first termination and a second termination, connected by a Context, in a Media Gateway, the first termination including a package provicing Signaling Gateway functionality and the second termination providing connection to the Media Gateway Controller over a TCP/IP interface;

the Media Gateway being further coupled to said first network and comprising processing means for implementing the lower layers of SS7, wherein Call Control related signaling information is transported between the first network and the Media Gateway Controller via the first and second terminations in the Media Gateway.

12. An Apparatus for transporting Call control related signaling information between a first telecommunications network employing Signaling System No. 7 (SS7) signaling and a second telecommunications network in which call control functionality is handled by Media Gateway Controllers and Bearer control is handled by Media Gateways, the apparatus comprising:

a Media Gateway coupled to a Media Gateway controller, the Media Gateway comprising a context for associating a first termination implementing lower layers of SS7 and representing a flow of signaling data between a Media Gateway and the first telecommunications network and a second termination representing a flow of signaling data between the Media Gateway and the Media Gateway controller, wherein Call Control related signaling data is routed between the first telecommunications network and said Media Gateway Controller through said Media Gateway controlled by said Media Gateway Controller.

* * * * *

UNITED STATES PATENT AND TRADEMARK OFFICE
CERTIFICATE OF CORRECTION

| | | |
|---|---|---|
| PATENT NO. | : 7,599,378 B2 | Page 1 of 1 |
| APPLICATION NO. | : 10/168996 | |
| DATED | : October 6, 2009 | |
| INVENTOR(S) | : Mecklin | |

It is certified that error appears in the above-identified patent and that said Letters Patent is hereby corrected as shown below:

In Column 1, Line 25, delete "MTPee3" and insert -- MTP3 --, therefor.

In Column 6, Line 1, in Claim 11, insert -- An --, before "Apparatus".

In Column 6, Line 2, in Claim 11, delete "informationa" and insert -- information --, therefor.

In Column 6, Line 13, in Claim 11, delete "provicing" and insert -- providing --, therefor.

Signed and Sealed this

Sixteenth Day of March, 2010

David J. Kappos
*Director of the United States Patent and Trademark Office*